Oct. 10, 1933.  W. S. HALEY  1,929,973

VALVE CONSTRUCTION

Filed April 22, 1933

Inventor
Walter S. Haley
By Attorneys
Southgate Hay & Hawley

Patented Oct. 10, 1933

1,929,973

UNITED STATES PATENT OFFICE 1,929,973

VALVE CONSTRUCTION

Walter S. Haley, Lincoln, N. H., assignor to William A. Hardy & Sons Co., Fitchburg, Mass., a corporation of Massachusetts Application April 22, 1933. Serial No. 667,468

3 Claims. (Cl. 251—34)

This invention relates to a valve for use to control the flow of liquids or gases.

The principal object of the invention is to provide means by which the valve can be turned accurately to allow a predetermined increase or decrease of flow of the fluid.

The invention also involves means by which the amount of increase or decrease is changed step by step, to get desired rates of flow, and not by gradual increment and to provide means by which the several positions of the valve for passing the several predetermined rates of flow will be indicated at a visible point.

Other objects and advantages of the invention will appear hereinafter.

Reference is to be had to the accompanying drawing, in which

Figure 1:
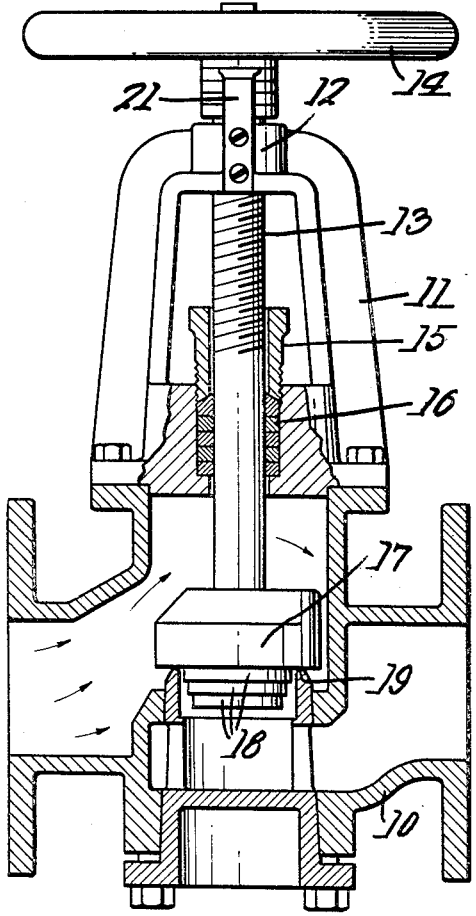
Fig. 1 is a central diametrical sectional view of a valve constructed in accordance with this invention.
Figure 2:
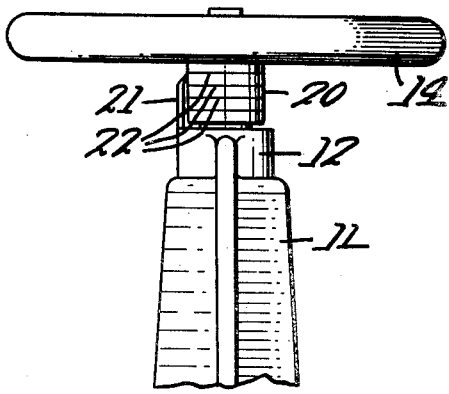
Fig. 2 is a side view of the top of the valve.
Figure 3:
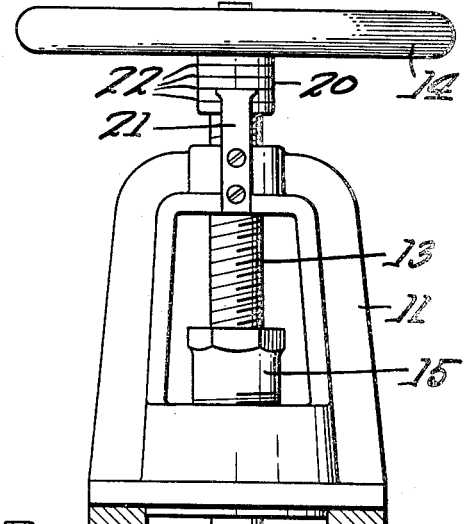
Fig. 3 is a view similar to Fig. 1 with more of the features in elevation and showing the valve open instead of closed.

The invention is applicable to almost any kind of screw valve and, as stated, it is intended for regulating the amount of flow so that several accurately predetermined rates can be secured. For this purpose the usual valve casing 10 is employed having a frame 11 at the top thereof carrying an integral nut 12 through which the valve stem screw 13 passes. A hand wheel 14 is provided on the end of the screw, as usual, for operating it.

The usual gland 15 and packing 16 are shown. The disc proper 17 is provided with a plurality of steps 18 projecting down from it. These steps preferably are cylindrical and each one is of smaller diameter than the next one above it. The flat lower surface of the disc above these steps engages the valve seat on the top of the valve seat member 19 to close the valve. These steps 18 are provided with the outer one rather close to the inner cylindrical surface of the valve seat member 19 and the others, of course, further away on account of their reduced diameters. Each of the steps or protrusions of the part 18, the number of which may vary according to the requirements, is accurately machined to allow a predetermined increase of flow for each step as the disc is raised.

Each protrusion is of a length equal to the lift incident to one full turn of the hand wheel. Hence the precision with which the flow is regulated is altered only at each full turn of the hand wheel.

To enable the operator at all times to select the flow desired, a graduated hub 20 is provided fixed on the stem of the screw directly under the hand wheel. On the frame 11 a stationary indicator 21 is provided to show on the scale 22 provided on the graduated hub the relative position of the disc and seat.

It will be seen that, in this way, an accurately constructed valve can be made to control the flow in a series of graduated steps accurately and the expense of the construction is not materially increased.

Although I have illustrated and described only one form of the invention I am aware of the fact that modifications can be made therein by any person skilled in the art without departing from the scope of the invention as expressed in the claims. Therefore, I do not wish to be limited in this respect otherwise than as set forth in the claims, but what I claim is:—

1. In a valve structure, the combination of a valve casing having a seat member provided with a vertical inner surface and a valve having a flat bottom surface adapted to close on the top of said seat member and provided with a plurality of stepped protrusions having vertical sides and each one being of a smaller size than the one above it, for the purpose described.

2. In a valve structure, the combination with a valve casing having an opening surrounded by a seat, of a valve having a flat surface for engaging said seat and closing the valve, said valve being provided with a series of cylindrical concentric portions projecting into said opening, each of said concentric portions having a smaller diameter than the next one between it and the flat surface of the valve, for the purpose described.

3. In a valve structure, the combination of a valve casing having a seat member provided with a vertical inner surface, a valve having a bottom surface adapted to close on the top of said seat member and provided with a plurality of stepped protrusions and each one being of a smaller size than the one above it, said valve having a threaded stem, a hand wheel fixed to the stem for operating it, a hub fixed on the stem just under the wheel and having graduations thereon at a distance apart equal to the pitch of the thread of the stem, and an indicator stationary with respect to said casing located adjacent to said scale, for the purpose described.

WALTER S. HALEY.